(12) United States Patent
Walter

(10) Patent No.: US 8,849,479 B2
(45) Date of Patent: Sep. 30, 2014

(54) METHOD AND DEVICE FOR AUTOMATICALLY ESTIMATING AN AIRSPEED OF AN AIRCRAFT

(75) Inventor: Stéphane Walter, Brax (FR)

(73) Assignee: Airbus Operations SAS, Toulouse (FR)

( * ) Notice: Subject to any disclaimer, the term of this patent is extended or adjusted under 35 U.S.C. 154(b) by 166 days.

(21) Appl. No.: 13/607,189

(22) Filed: Sep. 7, 2012

(65) Prior Publication Data

US 2013/0066488 A1    Mar. 14, 2013

(30) Foreign Application Priority Data

Sep. 9, 2011 (FR) ...................................... 11 58005

(51) Int. Cl.
| | | |
|---|---|---|
| *G06F 19/00* | (2011.01) | |
| *G01P 13/02* | (2006.01) | |
| *B64D 43/02* | (2006.01) | |
| *G01P 5/00* | (2006.01) | |

(52) U.S. Cl.
CPC .............. *G01P 13/025* (2013.01); *B64D 43/02* (2013.01); *G01P 5/00* (2013.01)
USPC .......................................................... 701/14

(58) Field of Classification Search
None
See application file for complete search history.

(56) References Cited

U.S. PATENT DOCUMENTS

| 7,617,023 | B2 | 11/2009 | Seve | |
|---|---|---|---|---|
| 2006/0241823 | A1 | 10/2006 | Greene | |
| 2011/0071710 | A1* | 3/2011 | Puig et al. | 701/14 |

FOREIGN PATENT DOCUMENTS

EP    2 348 285    7/2011

OTHER PUBLICATIONS

French Search Report dated Apr. 19, 2012.

* cited by examiner

*Primary Examiner* — Thomas Tarcza
*Assistant Examiner* — Garrett Evans
(74) *Attorney, Agent, or Firm* — Dickinson Wright PLLC

(57) ABSTRACT

A method for estimating aircraft airspeed by a processor and an airspeed estimation device, which includes the calculation of a value for aircraft aerodynamic speed (Vcaero), by an aerodynamic calculator, based on aircraft aerodynamic parameters and the calculation of a value for current aircraft speed (Vc) by an anemobarometric unit. An estimated airspeed (Vcest) is determined by adding, by an adding unit, a corrective value, determined by an airspeed integrating unit, to the value for Vcaero. The corrective value is determined, by the airspeed integrating unit, according to a comparison between: a residual speed value (VR), determined by a residual speed determination unit, with the value VR determined by correcting the value for Vcaero to a value that converges toward the value for Vc, and a predetermined threshold value ($\lambda$).

14 Claims, 1 Drawing Sheet

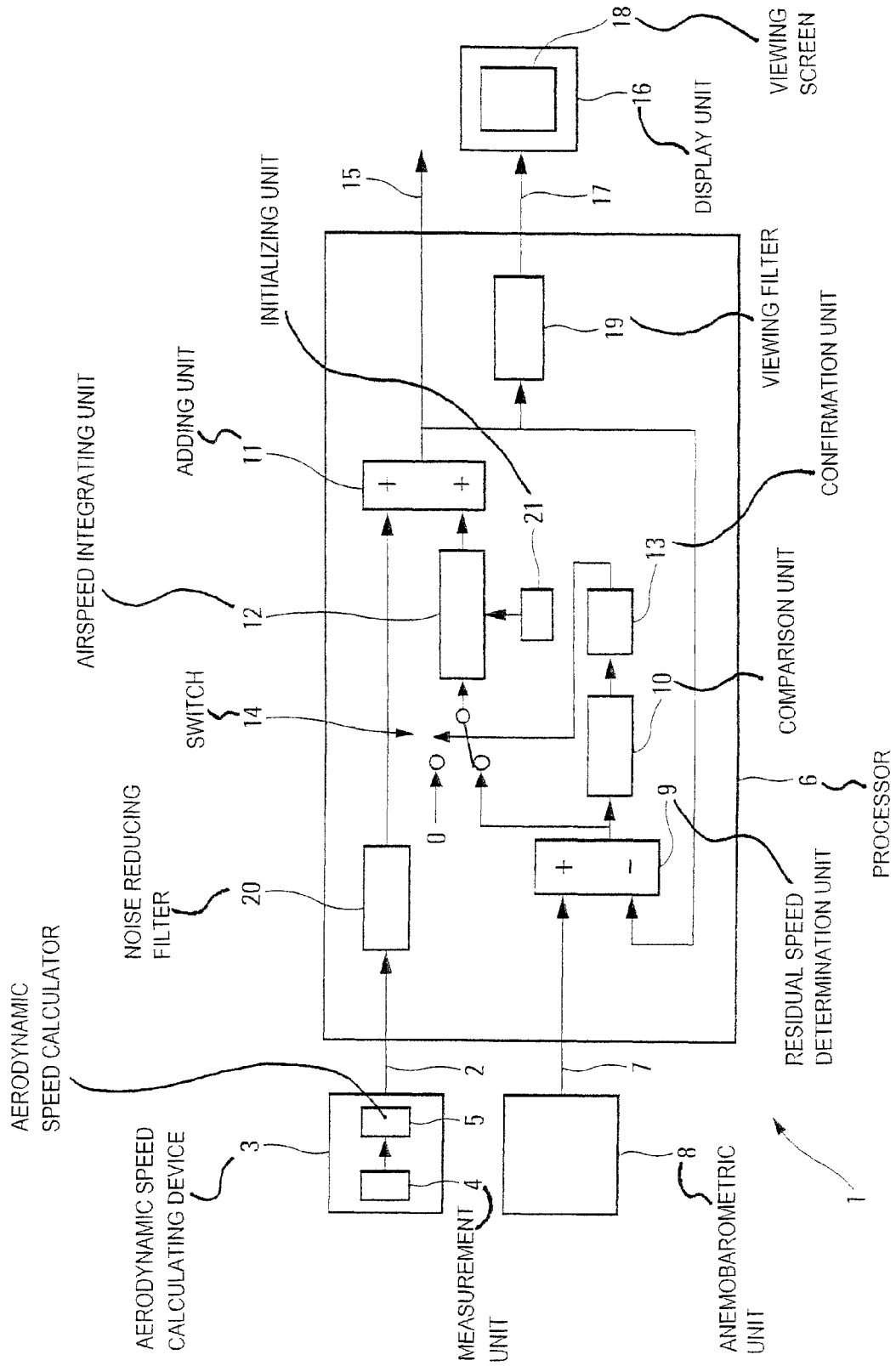

METHOD AND DEVICE FOR AUTOMATICALLY ESTIMATING AN AIRSPEED OF AN AIRCRAFT

FIELD OF THE INVENTION

The present invention relates to a method and a device for automatically estimating aircraft airspeed.

BACKGROUND OF THE INVENTION

It is known that an aircraft, in particular a transport airplane, is generally provided with an ADC (<<Air Data Computer>>) type anemobarometric unit providing in real time a conventional CAS (<<Calibrated Air Speed>>) type speed. To do so, such anemobarometric unit is associated with total pressure probes (Pitot tubes) and it can be part for example of an ADIRS (<<Air Data Inertial Reference System>>) type air data and inertial data system representing an inertial reference unit integrating the functions of the anemobarometric unit.

Now, erroneous or absent air data (including airspeeds) can for example appear upon failures of systems, and erroneous information from sensors or upon the presence of frost or ice crystals.

It is known that frost is a meteorological phenomenon, the appearance conditions of which are related to humidity and static temperature. Frost may have some effects on the sensors, such as the total pressure probes, up to leading to a degradation of the measurement, making it sometimes erroneous (fixed or biased).

It is thus interesting to be able to have available on the aircraft an alternative airspeed adapted to be determined even is a case of a failure of an anemobarometric unit and/or associated pressure probes, including Pitot heads.

Moreover, it is known that it is possible to calculate a so-called aerodynamic airspeed from the current values of parameters (mass, load factor, incidence, etc.) related to the aircraft, including aerodynamic parameters (load factor, incidence, etc.)

However, the parameters being used to calculate such airspeed, being available on an aircraft, are not sufficiently precise to obtain an airspeed being sufficiently reliable and precise to be used aboard an aircraft.

SUMMARY OF THE INVENTION

The present invention aims at remedying the above mentioned drawbacks. It relates to a method to automatically estimate airspeed of an aircraft, in particular a transport airplane, being particularly precise and adapted to be determined even in presence of erroneous air data.

With this object in view, according to the invention, said automatic airspeed estimation method, being a method wherein the following step is carried out on an automatic and iterative way:

a) a so-called aerodynamic airspeed, being calculated (in a preliminary step) from current values of parameters (mass, load factor, incidence, etc.) related to the aircraft and comprising aerodynamic parameters, is received,
is remarkable in that, moreover, the following steps are carried out on an automatic and iterative way:

b) a current conventional speed generated by an anemobarometric unit is received;

c) a residual speed is formed thru such conventional speed and an estimated airspeed;

d) such residual speed is compared to a threshold value; and e) as a function of such comparison:
as long as such residual speed is lower than or equal to said threshold value, it is integrated so as to obtain a corrective value being added to said aerodynamic speed to finally get the estimated airspeed; and
as soon as such residual speed is higher than a threshold value (upon a confirmation period) illustrating the detection of a validity problem for the conventional speed, and as long as this remains the case, a fixed corrective value is added to said aerodynamic speed to obtain the estimated airspeed.

Advantageously, said fixed corrective value corresponds to the last corrective value being calculated, before the detection of a validity problem for the conventional speed.

Furthermore, advantageously, at step c):
in a first embodiment, the speed estimated on the preceding iteration is subtracted from the conventional speed so as to obtain said residual speed; and
in a second embodiment, the conventional speed is divided by the airspeed so as to obtain said conventional speed.

Thus, thanks to the invention, there is aboard the aircraft alternative airspeed information (with respect to the usual speeds) being available, that:
on the one side, presents a sufficiently high precision so that it can be used by various systems of the aircraft;
on the other side, is adapted to be determined even in the case of a failure of an anemobarometric unit and/or associated pressure probes, including Pitot heads.

The method according to the invention allows the existing problems to be simultaneously obviated for two usual different airspeed calculation modes:
on the one side, in the absence of a validity problem for the conventional speed, it allows, thru the correction performed on the aerodynamic speed (so as to make it converge toward said conventional speed), to remedy the reduced precision problem for an aerodynamic speed especially due to the imprecision of the parameters being used, such as the incidence or the aircraft mass especially; and
on the other side, in a case of a validity (or loss) problem for the conventional speed, (especially upon a problem on the Pitot heads, for example, further to frost), it allows this last speed not to be taken into account.

In this last case, a precise value is always available, since the aerodynamic speed is permanently corrected, and this, thru the addition of a fixed corrective value being the most precise possible, as it corresponds to the last corrective value calculated before the detection of the validity program for the conventional speed.

Advantageously, for the integration implemented at step e), a time constant is used, which is previously determined so as to realize a compromise between, on the one side, a detection efficiency for the validity problem of the conventional speed, and, on the other side, a quick convergence in case of an imprecision of the aerodynamic speed.

Moreover, advantageously:
said aerodynamic speed is filtered before using it at step e); and/or
upon the takeoff of the aircraft, the integration implemented at step e) is initialized so that the estimated airspeed is equal to the conventional speed.

In an extra step f), said estimated airspeed is supplied to user means. The airspeed being estimated according to the invention can be used by various systems of the aircraft requiring precise and reliable speed information.

Moreover, advantageously, said estimated airspeed is shown on a viewing screen of the cockpit of the aircraft. In such a case, preferably, such estimated airspeed is filtered before showing it on the viewing screen.

The present invention also relates to an automatic airspeed estimation device for an aircraft, in particular a transport airplane.

With this object in view, according to the invention, said device of the type comprising means to iteratively receive a so-called aerodynamic airspeed being calculated from current values of parameters related to the aircraft, comprising aerodynamic parameters, is remarkable in that it also comprises:
means to iteratively receive a current conventional speed being generated by an anemobarometric unit;
means to iteratively form, thru such conventional speed and an estimated airspeed, a residual speed; to do so, such last means either subtract to the conventional speed the speed estimated on preceding iteration, or divide the conventional speed by the airspeed to form said residual speed;
means to iteratively compare such residual speed to a threshold value; and
means for:
as long as such residual speed is lower than or equal to said threshold value, integrating it so as to form a corrective value being added to said aerodynamic speed to obtain the estimated airspeed; and
as soon as such residual speed is higher than a threshold value (preferably during a confirmation period), illustrating the detection of a validity problem for the conventional speed, and as long as this remains the case, adding a fixed corrective value to said aerodynamic speed to obtain the estimated airspeed.

Furthermore, advantageously, said device also comprises;
means to determine said current values of the parameters related to the aircraft and to calculate said aerodynamic speed from such current values;
an anemobarometric unit to determine the conventional speed; and
user means for the airspeed being estimated by said device, and particularly a viewing screen in the cockpit of the aircraft.

The device according to the invention presents particularly the following advantages:
a robustness upon a change of aerodynamic configuration (slats/flaps, airbrakes, etc.);
a quick detection of frost in Pitot heads and of erroneous associated CAS information. This allows especially to avoid an inappropriate reaction from the crew to an erroneous airspeed indication, with the special risk to go beyond the authorized maximum speed; and
a quick adaptation to any type of aircraft.

The present invention also relates to an aircraft, in particular a transport airplane, comprising a device such as the above mentioned one.

BRIEF DESCRIPTION OF THE DRAWINGS

The sole FIG. of the accompanying drawing will make well understood how the invention can be implemented. Such sole FIG. is the bloc diagram of a device according to the invention.

DETAILED DESCRIPTION OF THE INVENTION

The device 1 according to the invention and schematically represented on the FIG. is adapted to automatically estimate an airspeed of an aircraft (not shown), in particular a transportation airplane, so as to provide an alternative airspeed which is particularly precise and is not disturbed or biased, especially by erroneous air data.

Said device 1 being onboard the aircraft is of the type comprising means 2 to iteratively receive a so-called aerodynamic airspeed being calculated from current values of parameters relative to the aircraft, comprising in particular aerodynamic parameters.

To do so, said device 1 comprises a usual unit 3 including:
usual means 4, in particular measurement means, to iteratively determine said current values of the parameters (mass, load factor, incidence, etc.) related to the aircraft; and
means 5 for iteratively calculating the aerodynamic speed thru said current values.

Said means 5 usually calculate said aerodynamic speed Vcaero thru the following expression:

$$V_{caero} = \sqrt{\frac{M * 9.81 * nz}{0.5 * \rho_0 * S * Cz\alpha * (\alpha + \alpha_0)}}$$

wherein:
M is the mass of the aircraft in kg;
nz is the vertical load factor;
$\rho_0$ is the air density being equal to 1.225 kg/m$^3$;
$Cz\alpha$ represents the lift gradient and is about 6;
$\alpha$ is the aircraft incidence; and
$\alpha_0$ is the incidence for a nil lift depending on the configuration of the slats and flaps and of the deflection of the airbrakes.

It is known that some of the preceding parameters (used to calculate the aerodynamic speed Vcaero), as being available aboard the aircraft, are not extremely precise. As an example, the mass is iteratively calculated depending on a total mass entered by the pilot before takeoff (representing an approximate estimation as a function in particular of the number of passengers) and of the current fuel consumption. Consequently, the aerodynamic speed Vcaero calculated with the above-mentioned expression is not sufficiently precise to be able to be used as such on an aircraft.

Thus, according to the invention, to determine an estimated airspeed being particularly precise, such device 1 comprises an information processing unit 6 of the iterative type comprising, further to said means 2 to receive the aerodynamic speed Vcaero:
means (namely a link 7) to iteratively receive a current conventional speed Vc of the ADC ("Air Data Computer") type, being usually generated by an anemobarometric unit 8 of the aircraft;
means 9 to subtract to this conventional speed Vc, on each iteration, a speed being estimated on preceding iteration, so as to obtain a residual speed VR;
comparison means 10 to iteratively compare such residual speed VR to a threshold value λ, for example 20 knots; and
means 11 to add a corrective value (depending on said comparison) to the aerodynamic speed Vcaero (generated by the unit 3) so as to obtain the estimated airspeed Vcest.

More precisely:
as long as the residual speed VR is lower than or equal to said threshold value λ, means 12 integrate such residual speed VR so as to form the corrective value (being added by means 11 to said aerodynamic speed Vcaero to obtain the estimated airspeed Vcest). According to the invention, this integration is such as the speed Vcaero is corrected so as to converge toward the conventional speed Vc; and as soon as such a residual speed VR is higher than the threshold value λ (and this during at least one confirmation period Tc, illustrating the detection of a validity problem for the conventional speed Vc, and as long as this remains the case, the means 11 use a fixed corrective value they add to said aerodynamic speed Vcaero to obtain the estimated airspeed Vcest.

To do so, the unit 6 also comprises a confirmation means 13 which is arranged downstream from the comparison means 10 to detect a validity problem for the conventional speed Vc, when the residual speed VR is higher than the threshold value λ, during at least the confirmation period Tc. Upon such detection, a switching means 14 is controlled to bring the input of the means 12 not to the output of the means 9 generating the residual speed VR, but to a nil value so that the means 10 use then the fixed corrective value (which is registered).

This fixed corrective value corresponds to the last corrective value calculated by the integration means 12 before the detection (by said means 10 and 13) of a validity problem for the conventional speed Vc.

In a particular embodiment, said means 9, instead of subtracting to the conventional speed Vc the speed estimated on preceding iteration, divide the conventional speed by the airspeed to form said conventional speed. The rest of the operation disclosed by reference to the FIG. is similarly applied to the particular embodiment.

So, thanks to the device 1 according to the invention, there is onboard the aircraft alternative airspeed information Vcest (with respect to the usual speed), being available and which:
 on the one side, shows a sufficiently high precision to be able to be used by various systems of the aircraft; and
 on the other side, is adapted to be determine even in the case of a validity problem for the conventional speed Vc, that is to say even in the case of a failure of an anemobarometric unit 8 or associated pressure probes, in particular Pitot heads.

The device 1 according to the invention further allows to simultaneously remedies the problems existing on two usual calculation modes for the airspeed:
 on the one side, in the absence of a validity problem for the conventional speed Vc, it allows, thru the correction performed on the aerodynamic speed Vcaero so as to make it converge toward such conventional speed Vc, to remedy the reduced precision problem for an aerodynamic speed Vcaero; and
 on the other side, in the case of a validity (or loss) problem for the conventional speed (Vc) especially upon a problem on the Pitot heads) not to take the latter into account.

In this last case, there is always a precise estimated airspeed Vcest, since the aerodynamic speed Vcaero is permanently corrected, by adding a fixed corrective value which is the most precise possible, since it corresponds to the last corrective value calculated before the detection of the validity problem for the conventional speed Vc.

For the integration implemented by the means 12, a time constant τ is used being previously determined to realize a compromise. More precisely, such time constant τ must be sufficiently quick to authorize a quick convergence in the case of an imprecision of the aerodynamic speed, but not too quick to be able to efficiently detect an erroneous speed Vc (10 s<τ<50 s).

The estimated airspeed Vcest so verifies the relationship:

$$Vcest = Vcaero \cdot (\tau s/(1+\tau s)) + Vc \cdot (1/(1+\tau s))$$

The device 1 according to the invention also comprises means (link 15) to supply the airspeed estimated by the unit 6 to user means (not shown). The airspeed being estimated according to the invention cannot thus be used by various systems of the aircraft requiring precise and reliable speed information.

In particular, in a particular embodiment, said device 1 further comprises display means 16 to show said estimated airspeed Vcest (received by a link 17) on a viewing screen 18 of the cockpit of the aircraft. In this case, preferably, the processing unit 6 comprises a filter 19 to filter said estimated airspeed before showing it on the viewing screen 18 so as to obtain a satisfactory visual comfort.

Moreover, said device 14 also comprises the anemobarometric unit 8 to usually determine the conventional speed Vc.

Furthermore, in a particular embodiment, said device 1 also comprises a filter 20 being arranged between the unit 3 and the means 11. Such a filter 20 is necessary due to noisy load factor and incidence information. Moreover, such filter allows the different information to be managed and adapted when the sampling rate is weak and different for each parameter. The time constant thereof may not be too high so as not to delay too much the aerodynamic calculation in the case of a high acceleration or deceleration.

Moreover, upon the takeoff of the aircraft, that is to say upon the activation of the device 1, the latter initializes the integrator means 12 (via means 21, to a Vc−Vcaero value so that the estimated airspeed Vcest is then equal to the conventional speed Vc.

The device 1 according to the invention presents in particular the following advantages:
 a robustness upon a change of aerodynamic configuration (slats/flaps, airbrakes, etc.);
 a quick detection for the frost in Pitot heads and erroneous associated CAS information. This allows especially any inappropriate reaction of the crew to be avoided for an indication of an erroneous airspeed, with the risk in particular to go beyond the authorized maximum speed; and
 a quick adaptation to any type of aircraft.

The invention claimed is:

1. A method for estimating aircraft airspeed implemented by a processor, comprising the steps of:
 A/ receiving, by the processor, a value for aircraft aerodynamic speed (Vcaero) based on measured aircraft aerodynamic parameters, which include at least one of mass, load factor, and incidence, with the value for Vcaero being calculated by an aerodynamic speed calculator;
 B/ receiving, by the processor, a value for current aircraft speed (Vc), the value for Vc being generated by an anemobarometric unit; and
 C/ determining an estimated airspeed (Vcest) by adding, by an adding unit of the processor, a corrective value, determined by an airspeed integrating unit of the processor, to the value for Vcaero,
 wherein the corrective value is determined, by the airspeed integrating unit of the processor, according to a comparison, by a comparison unit of the processor, which compares:
  a residual speed value (VR), determined by a residual speed determination unit of the processor, with the value VR determined from a value for Vcest determined by the adding unit in a step previous to step C/, and
  a predetermined threshold value (λ).

2. The method of claim 1, wherein the corrective value determined by the airspeed integrating unit is determined by merging the value for Vcaero toward the value for Vc at a determination, by the comparison unit, that the value VR is lower than or equal to the value λ.

3. The method of claim 1, wherein the corrective value is determined by the airspeed integrating unit to be a fixed corrective value, and the fixed corrective value is added, by the adding unit, to the value for Vcaero to obtain the value for Vest at a determination, by the comparison unit, that the value VR is higher than the value λ.

4. The method of claim 1, wherein the corrective value is determined, by the airspeed integrating unit, over a time constant ($\tau$).

5. The method of claim 1, wherein value VR is determined in iterative steps by the residual speed determination unit by subtracting the value for Vc from, or dividing the value for Vc by, a value for Vcest determined by the adding unit in a step previous to step C/.

6. The method of claim 5, wherein the corrective value is determined as in initial step, by the airspeed integrating unit, based on:
   initialization, by an initializing unit, to set an initial value for Vcest equal to the value for Vc.

7. The method of claim 1, wherein the value for Vcaero is calculated, by a calculating unit, according to the following expression:

$$V_{caero} = \sqrt{\frac{M*9.81*nz}{0.5*\rho_0*S*Cz\alpha*(\alpha+\alpha_0)}}$$

wherein:
M is mass of the aircraft in kg;
nz is vertical load factor;
$\rho_0$ is air density being equal to 1.225 kg/m³;
$Cz\alpha$ represents a lift gradient of about 6;
$\alpha$ is aircraft incidence; and
$\alpha_0$ is incidence for a nil lift based on the configuration of slats and flaps and airbrake deflection.

8. An airspeed estimation device for an aircraft, comprising:
   aerodynamic speed calculator configured for calculating a value for aircraft aerodynamic speed (Vcaero) based on measured aircraft aerodynamic parameters, which include at least one of mass, load factor, and incidence;
   anemobarometric unit configured for generating a value for current aircraft speed (Vc);
   adding unit configured for adding a corrective value, determined by an airspeed integrating unit, with the corrective value being added to the value for Vcaero to obtain a value for estimated air speed (Vcest);
   wherein the airspeed integrating unit is configured for determining the corrective value according to a comparison, by a comparison unit, which is configured for comparing:
      a residual speed value (VR) determined, by a residual speed determination unit, from an initial value for Vcest determined by the adding unit, and
      a predetermined threshold value (λ).

9. The device of claim 8, wherein the airspeed integrating unit is configured for determining the corrective value based on a correction to Vcaero, in which the corrective value is determined by merging the value for Vcaero toward the value for Vc at a determination, by the comparison unit, that the value VR is lower than or equal to the value λ.

10. The device of claim 8, wherein the adding unit is configured for adding the corrective value as a fixed corrective value to the value for Vcaero to obtain the value for Vest at a determination, by the comparison unit, that the value VR is higher than the value λ.

11. The device of claim 8, wherein the airspeed integrating unit is configured for determining the corrective value over a time constant ($\tau$).

12. The device of claim 8, wherein the residual speed determination unit is configured for determining, in iterative steps, the value VR by subtracting the value for Vc from, or dividing the value for Vc by, a value for Vcest determined as an initial step of the iterative steps carried out by the adding unit.

13. The device of claim 12, wherein the airspeed integrating unit is further configured for determining, in an initial step, the corrective value based on:
   initialization by an initializing unit to set an initial value for Vcest equal to the value for Vcaero.

14. The device of claim 8, wherein the value for Vcaero is calculated according to the following expression:

$$V_{caero} = \sqrt{\frac{M*9.81*nz}{0.5*\rho_0*S*Cz\alpha*(\alpha+\alpha_0)}}$$

wherein:
M is mass of the aircraft in kg;
nz is vertical load factor;
$\rho_0$ is air density being equal to 1.225 kg/m³;
$Cz\alpha$ represents a lift gradient of about 6;
$\alpha$ is aircraft incidence; and
$\alpha_0$ is incidence for a nil lift based on the configuration of slats and flaps and airbrake deflection.

* * * * *